United States Patent
Reichelderfer et al.

(10) Patent No.: US 12,329,318 B2
(45) Date of Patent: Jun. 17, 2025

(54) AUTOMATIC FRYER WITH HEATERS ENABLING REDUCED OIL VOLUME

(71) Applicant: Henny Penny Corporation, Eaton, OH (US)

(72) Inventors: Kimberly Reichelderfer, Springfield, OH (US); Stephen L. Wilks, Trotwood, OH (US)

(73) Assignee: Henny Penny Corporation, Eaton, OH (US)

( * ) Notice: Subject to any disclaimer, the term of this patent is extended or adjusted under 35 U.S.C. 154(b) by 1105 days.

(21) Appl. No.: 17/254,363

(22) PCT Filed: Jun. 28, 2019

(86) PCT No.: PCT/US2019/039766
§ 371 (c)(1),
(2) Date: Dec. 21, 2020

(87) PCT Pub. No.: WO2020/006380
PCT Pub. Date: Jan. 2, 2020

(65) Prior Publication Data
US 2021/0267414 A1     Sep. 2, 2021

Related U.S. Application Data

(60) Provisional application No. 62/692,029, filed on Jun. 29, 2018.

(51) Int. Cl.
*A47J 37/12* (2006.01)
*H05B 1/02* (2006.01)
*H05B 3/26* (2006.01)

(52) U.S. Cl.
CPC ....... *A47J 37/1261* (2013.01); *A47J 37/1214* (2013.01); *A47J 37/1223* (2013.01);
(Continued)

(58) Field of Classification Search
CPC . A47J 37/1261; A47J 37/1214; A47J 37/1228
See application file for complete search history.

(56) References Cited

U.S. PATENT DOCUMENTS 3,831,002 A * 8/1974 Mysicka ............... A47J 37/105
220/573.1
4,366,749 A * 1/1983 Caridis ..................... A23L 5/11
426/511
(Continued)

FOREIGN PATENT DOCUMENTS

| CN | 107136955 A | 9/2017 |
| EP | 1182953 B1 | 12/2006 |

OTHER PUBLICATIONS

European Patent Office, Extended Search Report issued in EP Application No. 19826151.3-1016 dated Jul. 27, 2022 (11 pages).
(Continued)

*Primary Examiner* — Sean M Michalski
(74) *Attorney, Agent, or Firm* — Wood Herron & Evans LLP

(57) ABSTRACT

An automatic cooking system is provided to reduce and/or optimize the amount of cooking medium required to operate the fryer, while improving the temperature and flow characteristics of cooking medium in the fryer. To this end, the cooking vat of the system is designed with one or more heating elements and one or more lanes for flow of cooking medium and food products between inlet and outlet ends, with the heating elements defining a low profile and/or being mounted externally to the cooking vat to avoid impeding flow of the cooking medium. One example of such a heating element is a printed heating element that is coupled to or directly printed on the cooking vat. This arrangement reduces the total volume of retained cooking medium
(Continued)

needed to flow and move food products along a length of the cooking vat during a cooking process.

9 Claims, 9 Drawing Sheets

(52) U.S. Cl.
CPC ......... *A47J 37/1266* (2013.01); *A47J 37/129* (2013.01); *H05B 1/0244* (2013.01); *H05B 3/26* (2013.01); *A47J 2202/00* (2013.01); *H05B 2203/005* (2013.01); *H05B 2203/013* (2013.01)

(56) References Cited

U.S. PATENT DOCUMENTS

| | | | | |
|---|---|---|---|---|
| 4,478,140 A * | 10/1984 | Bullock | ............... | A47J 37/1214 99/356 |
| 4,488,478 A * | 12/1984 | Leeper | ................ | A47J 37/1214 99/330 |
| 4,658,709 A | 4/1987 | Anderson | | |
| 4,706,556 A * | 11/1987 | Wallace | ............... | A47J 37/1214 99/330 |
| 4,863,750 A * | 9/1989 | Pawlak | ................... | A23L 19/18 426/441 |
| 4,913,042 A | 4/1990 | Miller | | |
| 5,137,740 A * | 8/1992 | Benson | ............... | A47J 37/1214 426/438 |
| 5,454,297 A * | 10/1995 | Phillips | ............... | A47J 37/1214 99/405 |
| 5,486,683 A * | 1/1996 | Shimizu | ................... | H05B 6/12 219/622 |
| 5,580,598 A * | 12/1996 | Benson | ..................... | A23L 5/11 426/523 |
| 5,782,164 A * | 7/1998 | Brintle | ................ | B01D 29/117 99/410 |
| 5,794,522 A * | 8/1998 | Bois | .................... | A47J 37/1261 219/442 |
| 5,924,414 A * | 7/1999 | Schallig | .............. | A47J 37/1223 99/403 |
| 6,058,245 A * | 5/2000 | McNamara, Jr. | ... | A47J 37/1266 126/374.1 |
| 6,086,249 A * | 7/2000 | Urich | ....................... | G01K 7/42 374/E5.019 |
| 6,095,037 A * | 8/2000 | Savage | ............... | A47J 37/1247 210/DIG. 8 |
| 6,173,643 B1 * | 1/2001 | Qian | ..................... | A47J 27/086 99/413 |
| 6,222,166 B1 | 4/2001 | Lin et al. | | |
| 6,240,835 B1 | 6/2001 | Bois et al. | | |
| 6,262,398 B1 | 7/2001 | Busquets et al. | | |
| 6,602,533 B1 * | 8/2003 | Smith | ................. | A47J 37/1214 426/523 |
| 6,666,131 B2 * | 12/2003 | Bizard | ................ | A47J 37/1285 99/330 |
| 6,772,677 B2 * | 8/2004 | Marotel | .............. | A47J 37/1209 99/330 |
| 7,209,651 B1 * | 4/2007 | Knoeppel | ............... | F24H 15/37 219/497 |
| 7,624,676 B2 | 12/2009 | Nishida et al. | | |
| 7,758,904 B2 * | 7/2010 | Smith | ....................... | A23L 5/11 426/231 |
| 7,789,165 B1 * | 9/2010 | Yen | ......................... | A62C 37/10 169/65 |
| 9,494,311 B2 * | 11/2016 | Moughton | ............. | F24H 15/132 |
| 2001/0003336 A1 * | 6/2001 | Abbott | ..................... | F27D 11/02 118/724 |
| 2004/0045448 A1 * | 3/2004 | Abe | ................... | A47J 27/21025 99/403 |
| 2004/0123742 A1 * | 7/2004 | Marotel | .............. | A47J 37/1209 99/330 |
| 2007/0125764 A1 * | 6/2007 | Knoeppel | ............. | F24H 15/132 219/497 |
| 2007/0127899 A1 * | 6/2007 | Friedrich | .............. | F24H 15/223 392/441 |
| 2010/0000419 A1 * | 1/2010 | Payen | ..................... | A47J 36/38 99/408 |
| 2012/0164314 A1 * | 6/2012 | LaBranche | ................ | C03C 8/18 252/514 |
| 2013/0008320 A1 * | 1/2013 | Kilmer | ................ | A47J 37/1223 210/167.28 |
| 2013/0036919 A1 * | 2/2013 | Desai | ......................... | A23L 5/12 99/403 |
| 2014/0030405 A1 * | 1/2014 | Spurr | ................... | A47J 37/1214 426/438 |
| 2014/0314927 A1 * | 10/2014 | Eichenlaub | ......... | A47J 37/1214 426/438 |
| 2015/0082997 A1 * | 3/2015 | Nothum, Jr. | ........ | A47J 37/1233 99/404 |
| 2016/0033463 A1 * | 2/2016 | Robertson | ........... | A47J 37/1223 99/330 |
| 2017/0158898 A1 * | 6/2017 | Xiao | .................... | C09D 11/104 |

OTHER PUBLICATIONS

International Searching Authority, Search Report and Written Opinion issued in International Application No. PCT/US2019/039766 mailed Sep. 13, 2019 (11 pages).

* cited by examiner

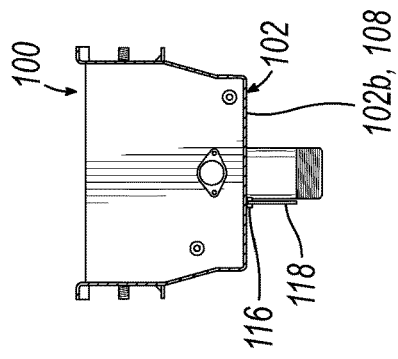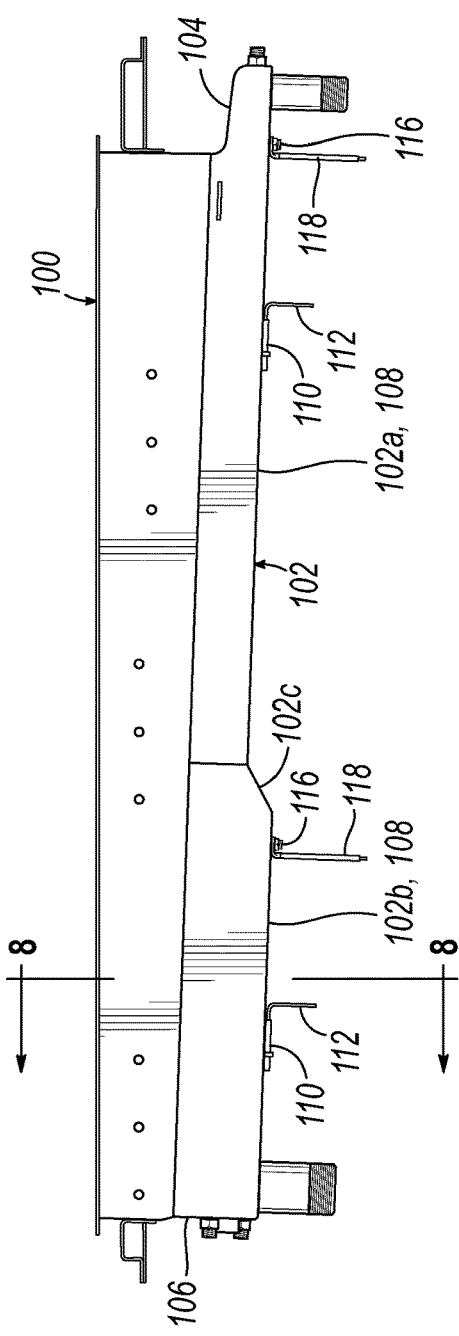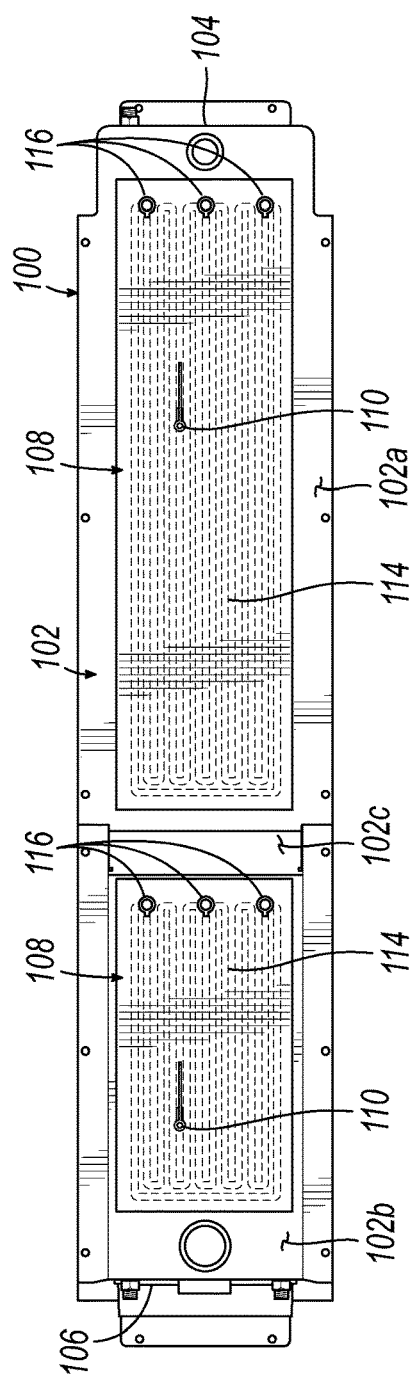

AUTOMATIC FRYER WITH HEATERS ENABLING REDUCED OIL VOLUME

CROSS-REFERENCE TO RELATED APPLICATION

This application is a national phase application of, and claims priority to, International Patent Application No. PCT/US2019/039766, filed on Jun. 28, 2019, which claims the benefit of U.S. Provisional Patent Application Ser. No. 62/692,029, filed Jun. 29, 2018, the disclosures of which are incorporated by reference herein in their entireties.

TECHNICAL FIELD

The invention generally relates to systems and methods for automatically heating and cooking food products using cooking medium in a cooking apparatus, such as a fryer and, more particularly, to systems and methods for optimizing the heating and use of the cooking medium in such fryers.

BACKGROUND

Oil-based frying is commonly used as a cooking method for a wide range of food, such as poultry, fish, potato products, and the like. Commercial fryers include one or more fry pots (also referred to as cooking chambers) that are filled with a cooking medium such as oil or solid fats. Heat is typically provided to the cooking medium using an electrical heating element submerged in the cooking medium or a gas burner thermally coupled to the cooking medium through the walls of the fry pot. When the cooking medium reaches a preset cooking temperature, food products are placed into the cooking medium for a predetermined amount of time during which the food products are cooked by heat from the cooking medium. To facilitate insertion and removal of the food products, the food products are typically placed inside a container, such as a wire basket, and the container lowered into the cooking medium for the predetermined amount of time.

Although many conventional fryers require manual movement of baskets of food products into and out of the cooking medium, some alternative fryer designs have been developed for automatically moving food products through a cooking cycle. In this regard, some baskets in fryers are configured to slide on a rail for loading and unloading of food products or can be automatically raised and lowered out of the oil. This type of movable basket requires complicated control mechanisms to track the basket locations. Augers are also used in some other types of fryers to move food products horizontally from submersion in oil, up and out to a dumping station. Augers are limited by slow operational speed and a resulting mess created by oil at the output side of the fryer. Conveyor belts and paddles are also commonly used in fryers to ensure even cooking and flow of the food products through the oil within a frying chamber, but these require multiple moving parts and can result in rough handling of the food products.

The cooking medium of a conventional fryer is normally re-used for multiple cooking cycles, which may include cooking cycles for different food products. However, the cooking medium degrades over time. This degradation may be due to contamination by particles shed by the food products being cooked and from chemical degradation due to heat, oxidation, and reactions with the food products. In addition, as food particles accumulate in the cooking medium, the flavor characteristics of the food particles may become infused in the cooking medium. This infusion may adversely affect the quality of cooked food. For at least these reasons, the cooking medium must occasionally be replaced and/or filtered. Known contemporary filtering systems require the operator to manipulate manual valves to route the cooking medium through the filter and to return it to a cooking vessel, e.g., a frypot, disposed within the fryer. Even experienced operators may open or close the valves incorrectly, which increases operating expenses through lost time. Periodically, the drain pan under the fryer may be removed for cleaning or to discard the cooking medium. If the operator forgets to replace the drain pan and opens the drain valve, the cooking medium drains onto the floor and is wasted, which greatly increases operating expenses.

Fryer manufacturers have recently developed improved fryer systems and methods to help address some of the shortcomings with conventional food product movement and filtration systems as set forth above. For example, the original assignee/Applicant of this application developed an automated fryer as shown and described in International Patent Publication No. WO 2017/078739, entitled "Automatic Fryer," the entire disclosure of which is hereby incorporated by reference herein. This fryer moves food products using a continuous flow of cooking medium through a series of gates, and the gates are selectively opened to allow batches of food product to move from portion to portion along the length of the fryer. The continuous flow of cooking medium is driven by a recirculating pump system, and the cooking medium is therefore continuously filtered during cooking operations. Technical advantages of this design include improved temperature uniformity of the cooking medium for all food products because the cooking medium is being continuously circulated, and the removal of manual food product movement with baskets. This fryer design improves the functionality and operation of conventional fryers, but further improvements and refinements of the design continue to be desirable. For example, the oil life span for this fryer design can be relatively short (when no top off procedure was used) and therefore could be improved.

Accordingly, it is desirable to further reduce and/or optimize the amount of cooking medium required to operate the fryers, while improving the temperature and flow characteristics of cooking medium in automated fryers. It is also desirable to optimize the heating of cooking medium in all types of fryers where reduced oil volume use is desired.

SUMMARY

To achieve the above design objectives and further improve the fryer art, in one embodiment an automatic cooking system for frying food products is provided. The system includes a cooking vat configured to hold a cooking medium and to receive food product. The cooking vat defines at least one elongated lane extending between an inlet end where the food product is inserted into the cooking vat and an outlet end where the food product is removed from the cooking vat. Each lane of the cooking vat includes a bottom wall and sidewalls extending along the lane. The system also includes an oil recirculation and filtration system in communication with the inlet and outlet ends. The oil recirculation and filtration system is configured to generate a continuous flow of cooking medium from the inlet end to the outlet end. The system further includes a heating element coupled to an exterior of the cooking vat along at least one of the bottom wall and the sidewalls. The heating element is configured to transfer heat by conduction into the cooking vat to uniformly heat the cooking medium. Positioning the heating element on the exterior of the cooking vat reduces a volume of the cooking medium that is needed to operate the automatic cooking system with the continuous flow of the cooking medium, which moves food product between the inlet and outlet ends during a cooking process.

In one aspect, the heating element includes at least one printed heating element directly coupled to the exterior of the cooking vat. The printed heating element further includes a resistor circuit trace that is spread over the exterior of the cooking vat to provide heat energy into the cooking vat.

In another aspect, the heating element is connected to the bottom wall of the cooking vat. For example, the heating element may be sized to engage a substantial majority of a surface area defined along the bottom wall of the cooking vat, to thereby provide generally uniform heating of cooking medium in the cooking vat. In such embodiments, the heating element may be connected to only the bottom wall of the cooking vat. In other embodiments, the heating element is connected to the bottom wall and the sidewalls of the cooking vat.

In a further aspect, the system also includes a controller and a temperature sensor. The controller is operatively coupled to the oil recirculation and filtration system and to the heating element. The temperature sensor is coupled directly to the heating element and configured to measure a heater temperature of the heating element, and then communicate the heater temperature to the controller. The controller controls the heating element to prevent the heater temperature from exceeding a temperature that may lead to a dry fire condition. The heating element, in some embodiments, may include a plurality of heating elements connected to the exterior of the cooking vat, and each heating element has a temperature sensor coupled directly to the heating element.

In yet another aspect, the bottom surface of each lane in the cooking vat is angled upwardly along at least a portion of a length from the inlet end to the outlet end. The combination of the bottom surface angling, the positioning of the heating element, and the continuous flow of cooking medium allows for cooking cycles to be performed on food products resulting in high quality of cooked food products and minimized use of oil volume, thereby improving the art of elongated fryers that move food product while cooking it.

In another embodiment in accordance with the invention, an automatic cooking system for frying food products is provided. The system includes a cooking vat configured to hold a cooking medium and to receive food product. The cooking vat defines at least one elongated lane extending between an inlet end where the food product is inserted into the cooking vat and an outlet end where the food product is removed from the cooking vat. Each lane of the cooking vat includes a bottom wall and sidewalls extending along the lane. The system also includes an oil recirculation and filtration system in communication with the inlet and outlet ends. The oil recirculation and filtration system is configured to generate a continuous flow of cooking medium from the inlet end to the outlet end. The system further includes a heating element coupled to at least one of the bottom wall and the sidewalls. The heating element includes at least one printed heating element directly coupled to the cooking vat so as to transfer heat by conduction to uniformly heat the cooking medium. The printed heating element defines a low profile that does not impede the continuous flow of the cooking medium. This arrangement reduces a volume of the cooking medium that is needed to operate the automatic cooking system with the continuous flow of the cooking medium, which moves food product between the inlet and outlet ends during a cooking process.

In one aspect, the printed heating element is coupled to the cooking vat by being printed on at least one of the bottom wall and the sidewalls of the cooking vat, thereby making the printed heating element and the cooking vat define a unitary, one-piece construction. Each of the other aspects and elements described above can be combined with this embodiment of the automatic cooking system, as will be readily understood from the further description of several examples in the Detailed Description section below.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

FIG. 7 is a side elevational view of a cooking vat of an automatic cooking system in accordance with another embodiment of the invention, the cooking vat including printed heaters along an external surface thereof.

FIG. 8 is a front elevational view of the cooking vat of FIG. 7, showing cross-sectional shape details thereof.

FIG. 9 is a bottom view of the cooking vat of FIG. 7, showing further details of the printed heaters and the temperature sensors mounted thereon.

DETAILED DESCRIPTION

Figure 1:
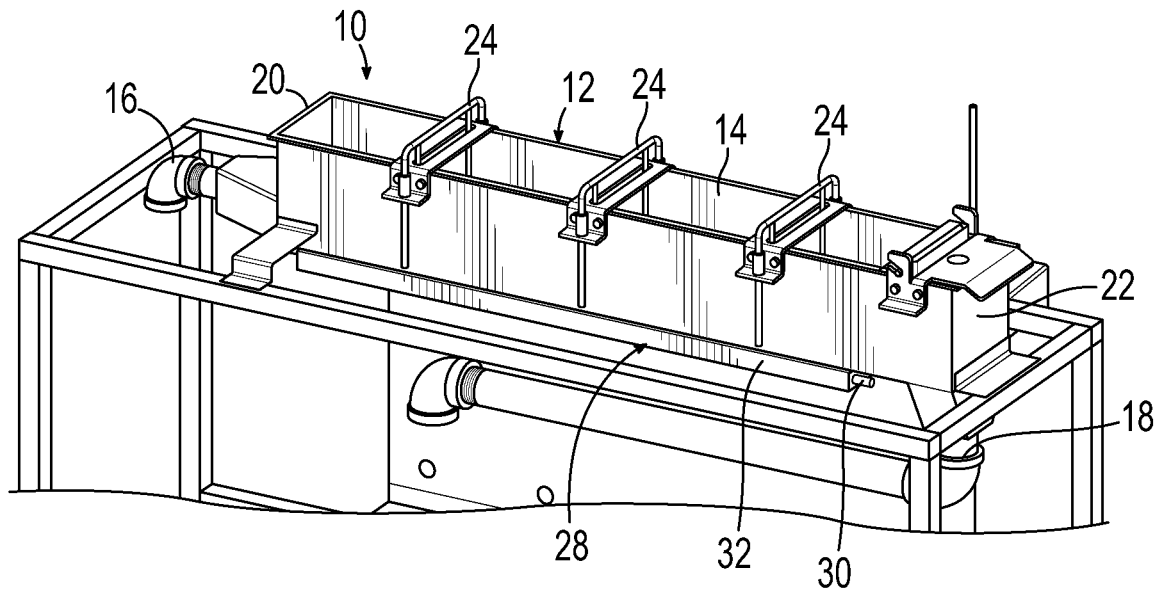
FIG. 1 is a top perspective view of an automatic cooking system in accordance with one embodiment of this invention, the automatic cooking system including one lane defined by a cooking vat.
Figure 2:
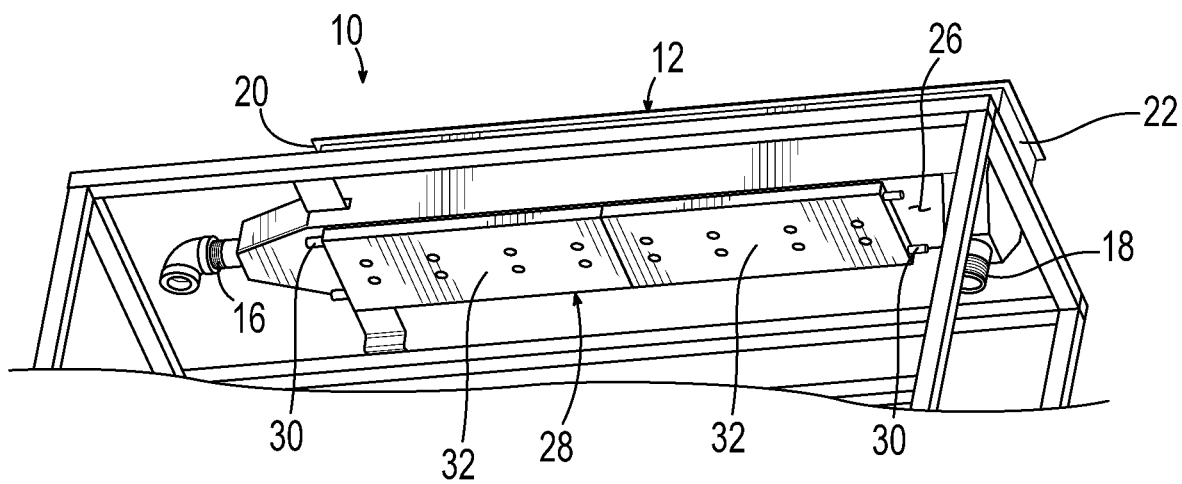
FIG. 2 is a bottom perspective view of the cooking vat included in the automatic cooking system of FIG. 1.
Figure 3:
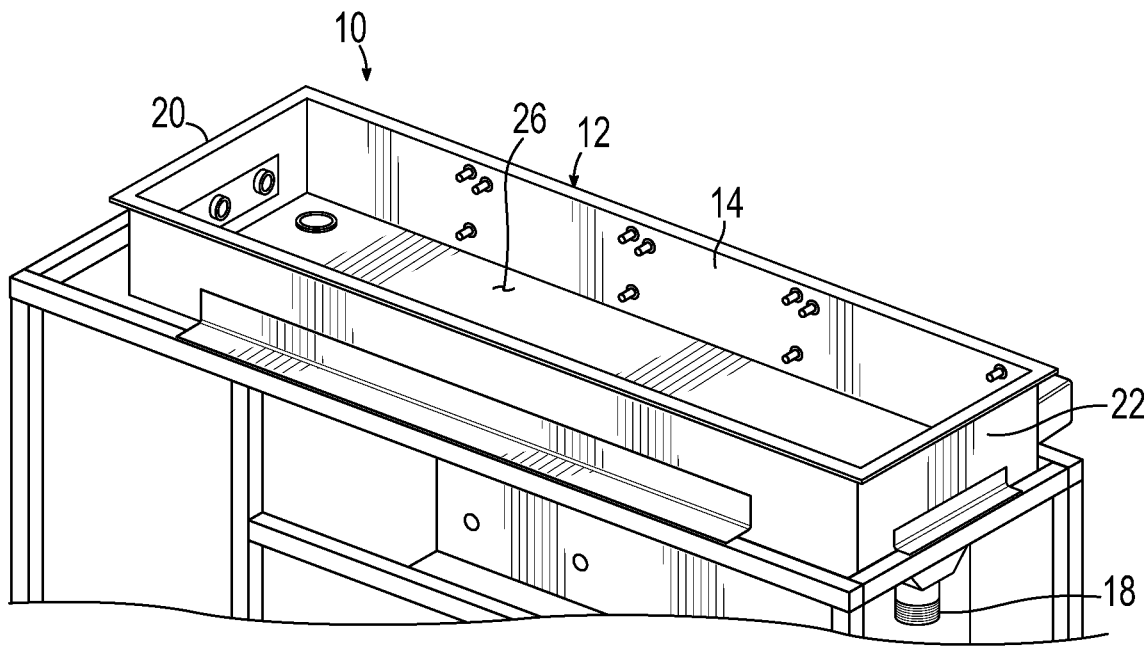
FIG. 3 is a further top perspective view of the cooking vat of the automatic cooking system of FIG. 1, with the gates removed from view.
Figure 4:
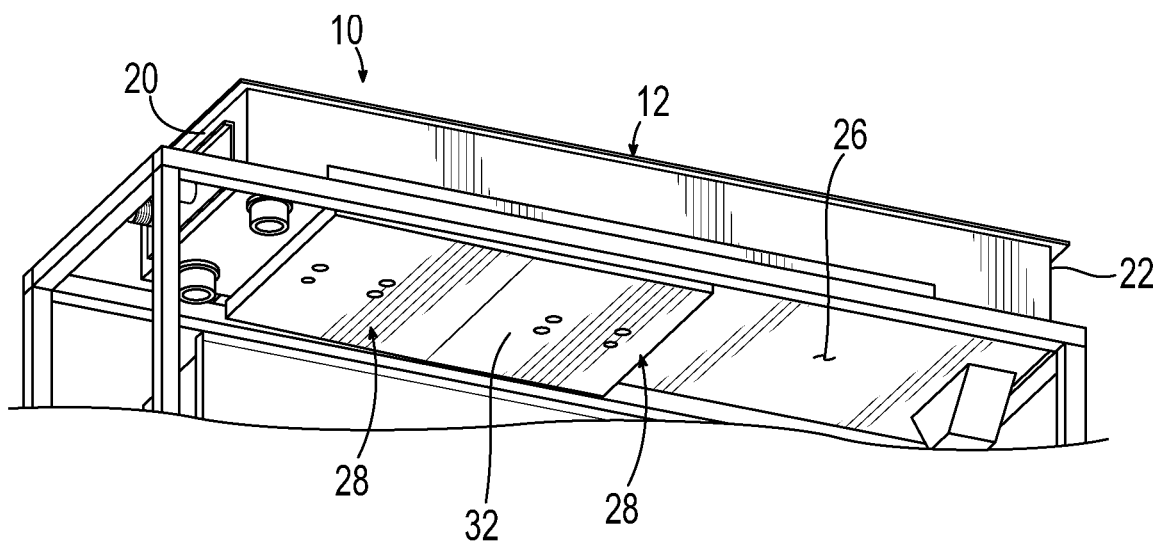
FIG. 4 is a further bottom perspective view of the cooking vat of FIG. 3.

Embodiments of the invention are directed to automatic cooking systems and methods of controlling a fryer, which reduce and/or optimize the amount of cooking medium required to operate the fryers. Additionally, the invention also provides optimization of heating and use of cooking medium in various fryer designs. To this end, the cooking vat of the system in all embodiments is designed with one or more heating elements that may be provided along an exterior thereof (and/or are provided with a low profile) and multiple lanes for flow of cooking medium and food products, thereby reducing the total volume of retained cooking medium used in the cooking process. Moreover, the use of continuous oil flow and filtration in combination with the new profiles of the lanes in the cooking vat reduce or remove altogether the need to discard used oil when a periodic top off with new oil/cooking medium is required. By improving the flow characteristics and uniform heat transfer into the cooking medium in the automatic cooking system, the embodiments described herein help minimize use and waste of cooking medium and therefore operate more efficiently than conventional fryer designs.

With reference to FIGS. 1 through 4, a first embodiment of the automatic cooking system 10 of the current invention is shown in further detail. The system 10 includes a cooking vat 12 with one lane 14 for cooking medium and food product movement, but it will be appreciated that more than one of the lanes 14 may be provided in larger versions of the cooking vat 12. The cooking vat 12 is shown empty in these Figures. The cooking vat 12 includes a pump (not shown) and an oil recirculation system (not shown except for inlet and outlet pipes 16, 18 extending from the cooking vat) to generate a continuous flow of cooking medium from an inlet end 20 of the cooking vat 12 to an outlet end 22 of the cooking vat 12. Food products move from portion to portion along the lane 14 of the cooking vat 12 because of the cooking medium flow, with control of the food product movement provided by the series of gates 24 shown in FIG. 1. The gates 24 are perforated and otherwise function in a similar manner as locks on a river. Thus, the food products can be retained in the heated cooking medium for a time sufficient for fully cooking the food products, and then the food products can be removed from the outlet end 22 of the cooking vat 12 at the completion of the cooking cycle.

As shown in FIGS. 1 through 4, the lane 14 of the cooking vat 12 in this embodiment is generally rectangular in cross-section, having a bottom surface 26 (also referred to as the "bottom wall" in this and other embodiments) that is 12 inches wide between the corners of the cooking vat 12, in one example. To reduce the amount of cooking medium volume within the cooking vat 12, the heating elements 28 are provided on the exterior of the cooking vat 12. The heating elements 28 include a rod heater 30 cast into an aluminum bar 32 (or block), which is then coupled in face-to-face abutting contact with the bottom surface 26 of the cooking vat 12. The heating elements 28 therefore transfer heat energy by conduction through the cooking vat 12 and into the cooking medium. By placing the heating elements 28 along an exterior of cooking vat 12, the cooking medium and food products do not need to flow around the heating elements 28 and turbulent flow is reduced/avoided, which reduces oxidation of the cooking medium and thereby improves cooking medium lifespan.

In the example shown with a 12-inch wide lane, a heating element configured to output 7 to 8 KW was sufficient in testing results to heat the cooking medium in the cooking vat 12 to an operating temperature of at least 350° F. and maintain the cooking medium at that temperature through multiple cooking cycles of food products. The large contact surface between the cast bar 32 of the heating elements 28 and the bottom surface 26 advantageously generates a uniform heat transfer and temperature in the shallow pool of cooking medium within the cooking vat 12. The exemplary cooking vat 12 shown in this embodiment requires approximately 35 pounds of cooking medium per lane 14, to provide an oil depth of 1.5 inches, which provides desirable flow of batches of food products (of approximately 0.75 pounds) from gate to gate 24 when the cooking medium is circulated using the oil recirculation system. Likewise, this embodiment of the automatic cooking system 10 reduces oil use compared to conventional fryer designs, while also improving oil life, e.g., the total length of time or number of cooking cycles that can be performed before cooking medium replacement is required. The reduced oil volume is achieved at least in part by positioning the heating elements 28 on an exterior surface of the cooking vat 12.

Figure 5:
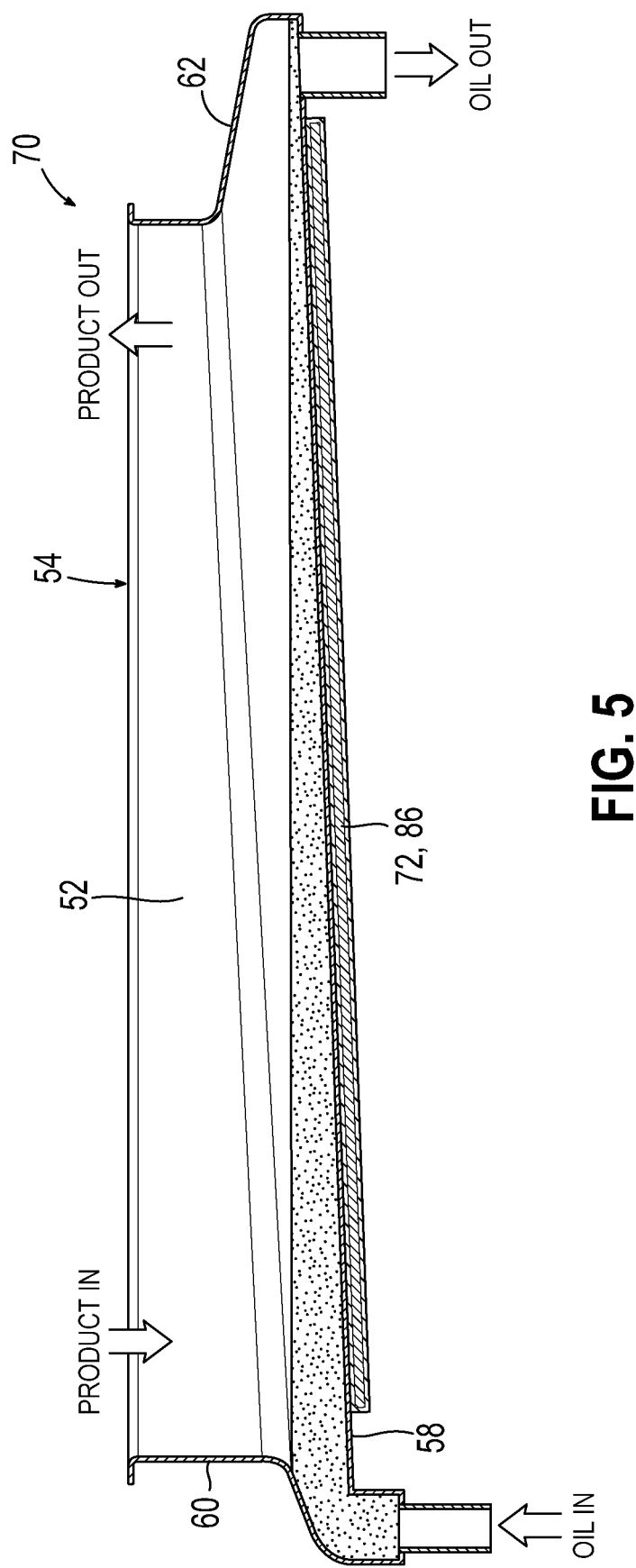
FIG. 5 is a side cross-sectional view of one of the lanes of a cooking vat that may be used in another embodiment of the automatic cooking system of this invention.
Figure 6A:
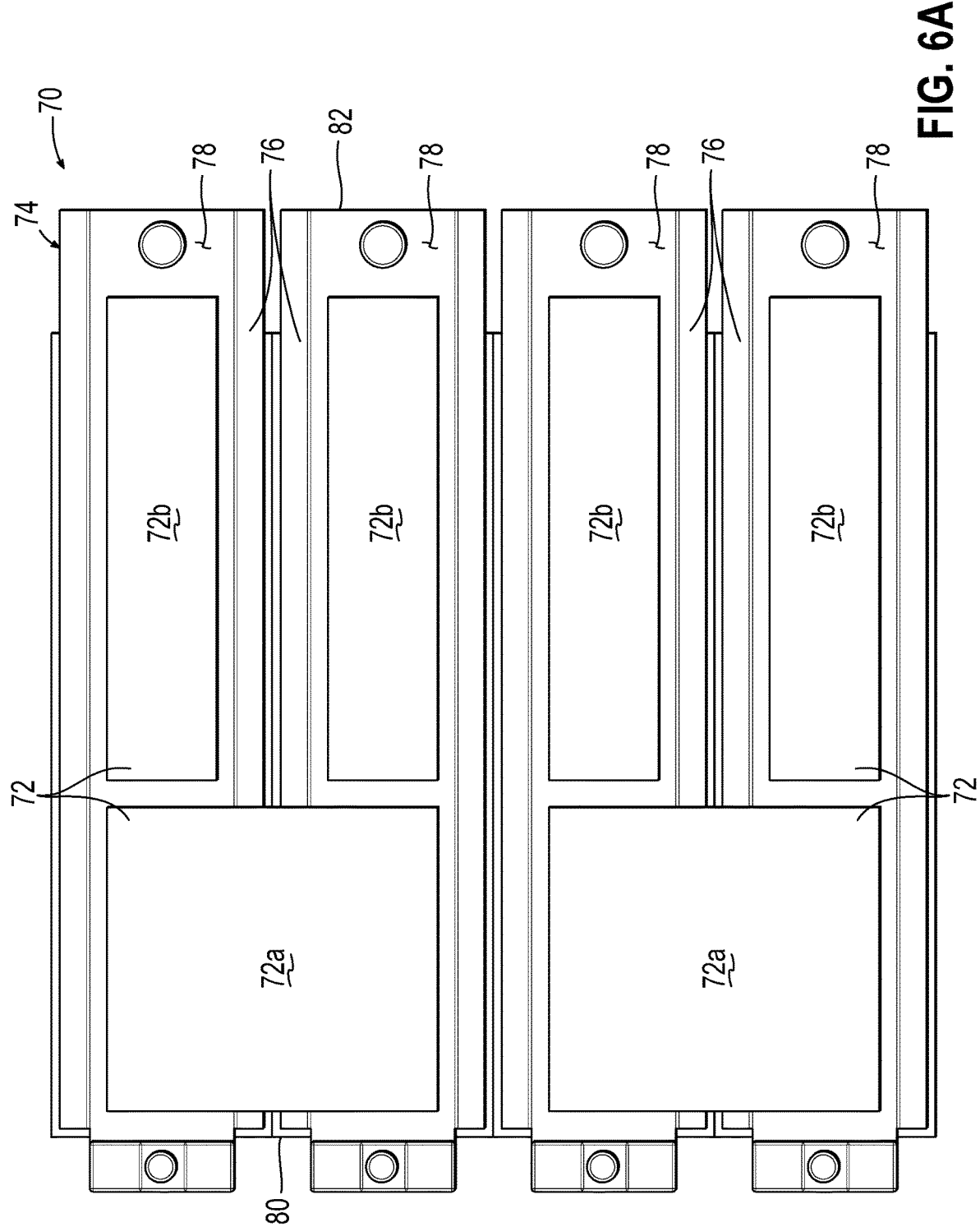
FIG. 6A is a schematic bottom view of the cooking vat of FIG. 5, with a first configuration for heating elements.
Figure 6B:
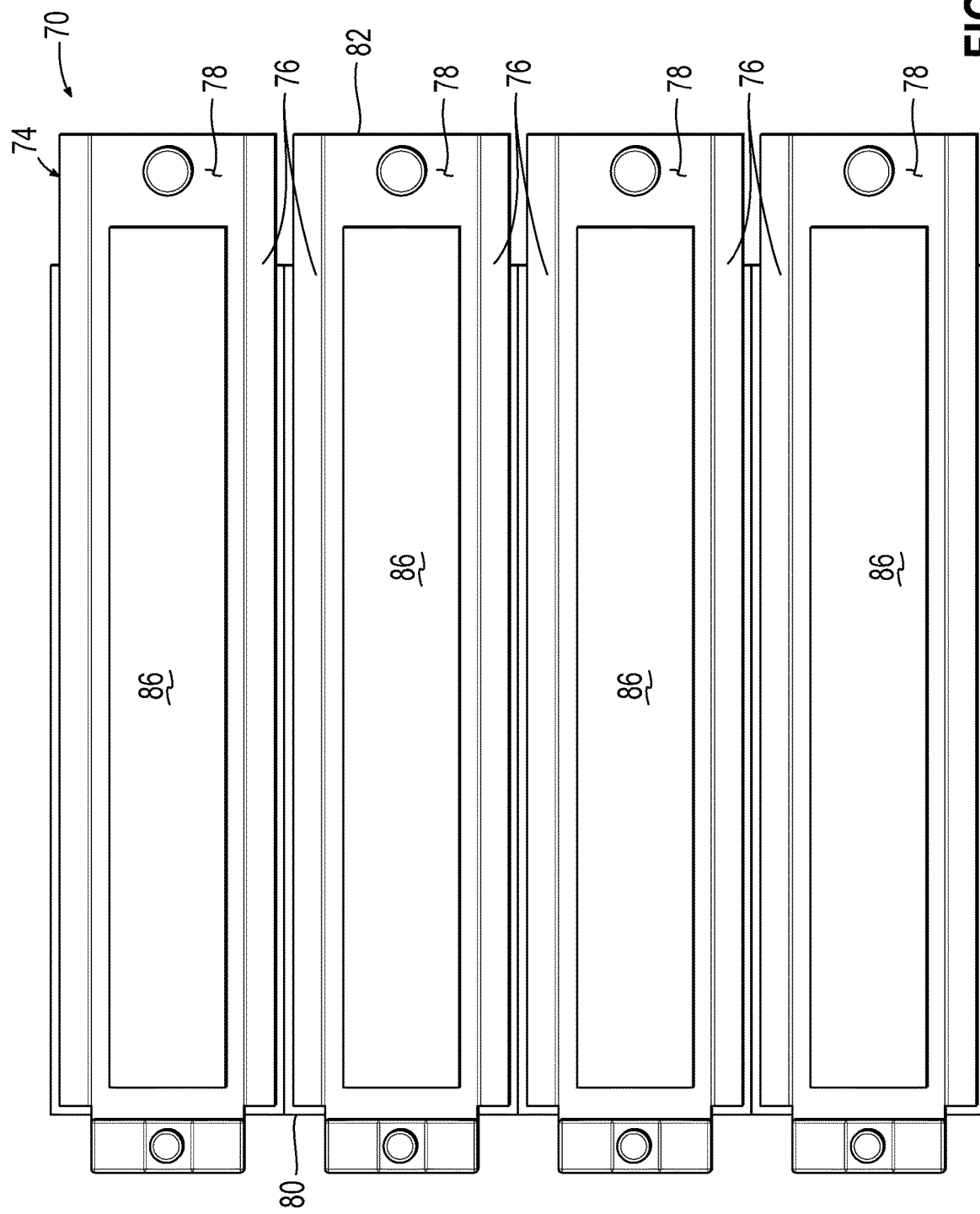
FIG. 6B is a schematic bottom view of the cooking vat of FIG. 5, with a second configuration for heating elements.
Figure 6C:
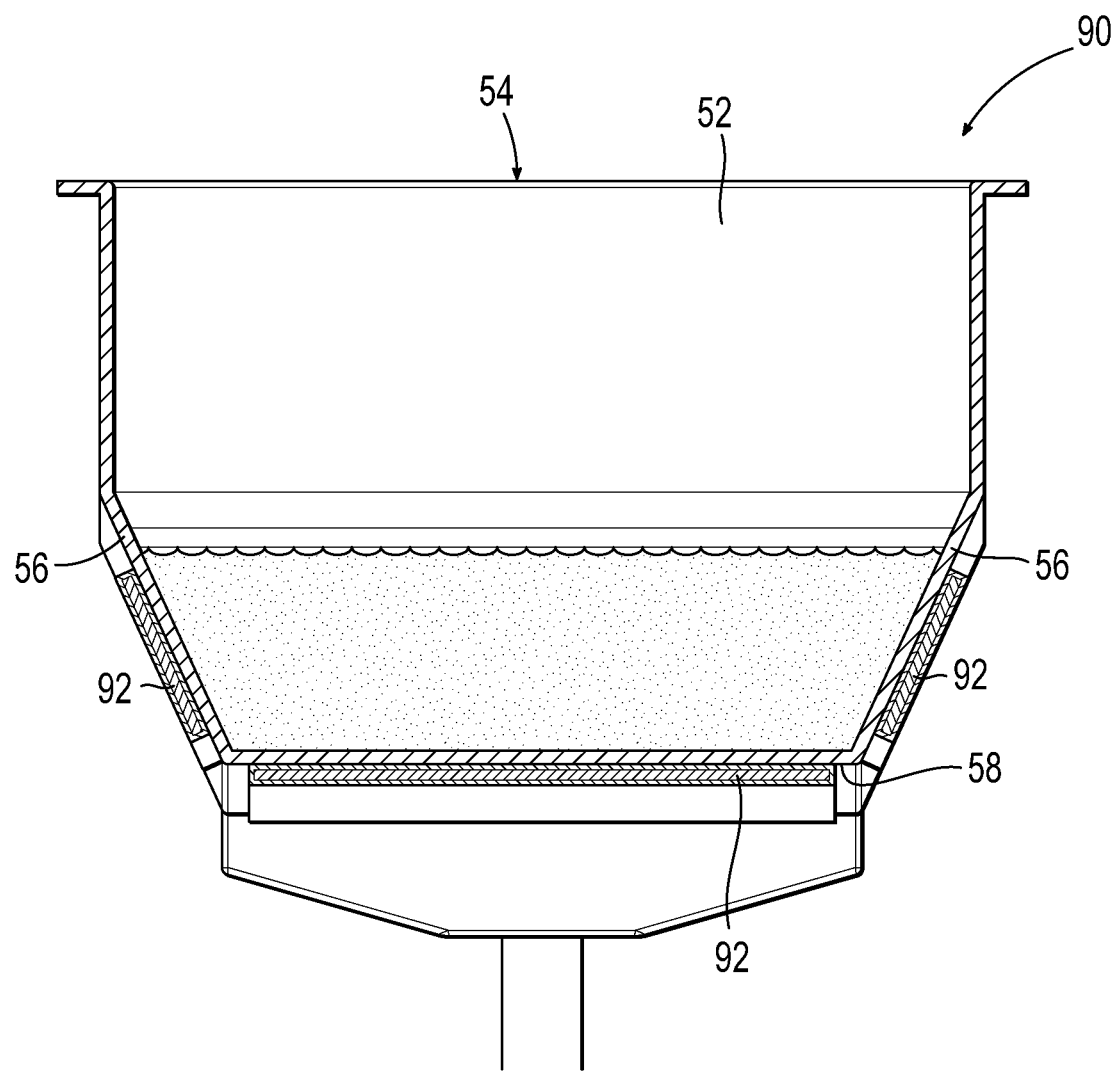
FIG. 6C is a front cross-sectional view of one of the lanes in the cooking vat of FIG. 5, showing a third configuration for heating elements.

A four-lane cooking vat of a second embodiment of the automatic cooking system 70 is shown in FIGS. 5 through 6C. Each of the 12-inch wide lanes 14 from the first embodiment is effectively replaced by two of the lanes 52 in the cooking vat 54 shown in FIG. 5. To this end, each lane 52 is about 6 inches wide at the top opening thereof, and the cross section of the lane 52 is modified to have chamfered corner surfaces 56 at the bottom to provide a hexagonal shape and a narrowed bottom surface 58 that is about 5 inches in width. In addition, the bottom surface 58 of the lanes 52 are angled upwardly along at least a portion of the length from an inlet end 60 of the cooking vat 54 to an outlet end 62 of the cooking vat 54, most clearly shown in FIG. 5. The bottom surface 58 is angled upwardly along an entire length of the lane 52 in the illustrated embodiment. The oil, which levels out due to gravity, is therefore deeper at the inlet end 60 to assure full food product coverage when the food products are initially placed into the cooking vat 54. The shallower depth at the outlet end 62, where the cooked food products are removed for finishing at a packaging zone outside the cooking vat 54, advantageously increases oil flow velocity towards the plumbing of the oil recirculation system. These revisions to the cooking vat 54 result in oil volume of about 12.5 pounds per lane 52. This is an improvement of oil volume use (2 lanes use 25 pounds of cooking medium as compared to 35 pounds in the first embodiment). Thus, the cooking vat 54 and lanes 52 in the second embodiment improve oil life span by pulling off an amount of oil volume approaching a 20% top off volume per hour of operation, while also significantly reducing the total oil volume needed within the cooking system 50. Like the first embodiment, the cooking vat may also achieve reduced use of cooking medium volume by placing heating elements 72, 86 externally to the cooking vat.

Moreover, the flow characteristics of the cooking medium and the food products are improved thanks to the design of the lanes 52 of the cooking vat 54. The angled bottom surface 58 and the chamfered corner surfaces 56 at the bottom of the lanes 52 help avoid impeding cooking medium flow in a manner that would generate turbulence in the cooking medium that can increase oxidation of the oil (reduces oil life span) while also improving reliability of flow of food products from gate to gate (gates not shown in these views). The generally increasing velocity of oil along the length of each lane 52 also helps assure reliable food product movement from gate to gate. The heating elements 72, 86 are once again provided outside the interior of the cooking vat 54 to improve flow characteristics and avoid generation of turbulence in the cooking medium. Thus, the second embodiment of the automatic cooking system 50 provides several functional advantages, including improved oil life span, reduced oil volume use, and better flow of food products between inlet and outlet ends 60, 62 of the cooking vat 54.

As initially described above, the heating elements of the automatic cooking system according to some embodiments are designed to be heater rods cast in aluminum bars or blocks that are coupled to the bottom surface(s) of the lanes defining the cooking vat, to thereby provide uniform heating of the cooking medium via conduction through the cooking vat walls. As set forth below, alternative types of heating elements such as printed heating elements with a low profile may also be used in accordance with this invention. Regardless of the design chosen, the heating elements may be positioned and configured in various manners, some examples of which are shown in FIGS. 6A through 6C in association with the second embodiment of the automatic cooking system.

FIGS. 6A and 6B show two different configurations of heating elements 72 in association with the second embodiment of the automatic cooking system. To this end, the cooking vat 74 of this cooking system 70 includes four parallel lanes 76, and FIG. 6A shows one configuration for heating elements 72 along the bottom surfaces 78 of the cooking vat 74. Larger size heaters 72a are positioned across two or more of the lanes 76 adjacent the inlet end 80 of the cooking vat 74, while smaller size heaters 72b are positioned on each lane 76 individually adjacent the outlet end 82 of the cooking vat 74. The combination of larger and smaller heaters 72a, 72b collectively engages with a substantial majority (e.g., 80% or more) of the surface area along the bottom surfaces 78 (the about 5-inch-wide surfaces) of each lane 76 of the cooking vat 74, thereby enabling the uniform heat transfer desired and needed to maintain the cooking medium at operating temperatures of 350° F. or higher. That arrangement of engagement with a large amount of surface area on the lanes 76 is maintained in each of the examples shown.

Turning to FIG. 6B, another configuration of the heating elements 86 is shown. Each lane 76 of the cooking vat 74 includes a single elongated heating element 86 connected to the about 5-inch wide bottom surface 78 thereof in this embodiment. The heating element 86 follows the angling of this bottom surface 78, as described above in connection with the second embodiment of the system. Such an embodiment may be used to individually control the lanes 76 when such individual control is desired (e.g., when fewer than the maximum number of lanes 76 may be used in operation of the cooking system 10). As will be understood, this and other embodiments of the cooking system 70 may use heating elements 86 that include rod heaters in cast blocks of aluminum, or printed heating elements, or other known designs for conducting heat into the cooking vat 74.

In FIG. 6C, a further configuration is shown of a cooking system 90, which includes similar elements as one of the lanes 52 in the cooking vat 54 shown in FIG. 5 (identical reference numbers are used where elements are unchanged from the embodiment described above). This cooking system 90 includes heating elements 92 mounted on the exterior of the cooking vat 54 along both the bottom surface 58 and the chamfered corner surfaces 56 at the bottom end of each lane 52 of the cooking vat 54. The heating elements 92 of each configuration may be coupled to the cooking vat 54 using various methods, including but not limited to, welded studs on the bottom surface 58 of each lane 52, and/or spring-loaded clamps. Regardless of the configuration and coupling mechanism chosen, the heating elements 92 provide uniform heating and temperatures within the cooking medium during cooking operations, and the heat transfer and temperature uniformity is further improved by the continuous flow of cooking medium through the cooking vat 54 and through the oil recirculation system.

As described above, although the external heating elements shown and described in connection with the embodiments of the automatic cooking system shown in FIG. 1 through 6D is a clamped-on or bolted-on aluminum block heater, alternative designs of heating elements can also be used in these embodiments. In this regard, the heating elements used with an electric fryer such as these automatic cooking systems can instead be defined by printed heating elements such as the thick film conduction heaters available commercially from supplies such as Watlow of St. Louis, MO. For example, the "430 stainless steel thick film conduction heater" available from Watlow includes a resistor circuit trace embedded in the material printing process into one or more dielectric glass layers, which may also be incorporated on one or more 430 stainless steel substrates, and the heater can also include additional layers like a mica insulator along one side to ensure heat energy is transferred from the heater into the element to which the heater is directly connected. The thick film conduction heater defines a low profile based on a small thickness when fully printed, while allowing for efficient heating of elements that the thick film conduction heater is directly applied to.

Further examples showing one or more printed heating elements as described above in connection with a fryer are shown in the embodiments of FIGS. 7 through 13. More specifically, these Figures illustrate the printed heating elements in combination with an automatic cooking system including one or more lanes for moving food product and cooking it as the food product moves between gates and stations, as set forth in the embodiments described above.

In FIGS. 7 through 9, several views are provided of a cooking vat 100 for another embodiment of an automatic cooking system, this one defining a single lane for food product movement during the cooking process. As with previous embodiments, the cooking vat 100 has a profiled and/or angled bottom wall 102 which allows for reduction in oil volume level as the food product moves along the length of the cooking vat 100, with increased oil flow velocity towards the end of the fryer. More specifically, the bottom wall 102 may include a first portion 102a along an inlet end 104 and a second portion 102b along an outlet end 106, each portion being angled slightly upwardly from horizontal along the movement direction of food product traveling between the inlet end 104 and the outlet end 106. The first and second portions 102a, 102b are connected in this embodiment by a transition portion 102c of the bottom wall 102 that is angled from the orientation of the other two portions 102a, 102b. Such a configuration of the bottom wall 102 may be desirable to achieve certain flow characteristics along the lane defined by the cooking vat 100. For example, the cooking vat 100 may transition from a generally flat bottom along the first portion 102a of the bottom wall 102 to a bottom with chamfered corners (or sidewall portions) proximate the edges of the bottom wall 102 along the second portion 102b, see FIG. 8, and in such embodiments, the flow of cooking medium and food products is enhanced by the change in shape of the cooking vat 100 towards the outlet end 106 (the transition portion 102c helps accommodate this variation of shape of the cooking vat 100). It will be understood that this is but one example of the shape of an elongated cooking lane defined by the cooking vat 100, and other shapes and profiles may be used without departing from the scope of the invention.

In this embodiment, printed heating elements 108 are applied to the bottom wall 102 of the cooking vat 100, and specifically, applied along the two large generally rectangular sections of that bottom wall 102 defined by the first and second portions 102a, 102b. The thin profile or thickness of the printed heating elements 108 make these elements difficult to see in the side views shown at FIGS. 7 and 8. Nevertheless, each of the printed heating elements 108 includes a temperature sensor 110 mounted directly on the surface of the heating element 108, with a control wire 112 (shown in partial form) leading to the system controller for the automatic cooking system. For example, each temperature sensor 110 may be an RTD sensor, and the temperature sensors 110 are thus positioned to detect the heater temperature defined by the printed heating elements 108. By controlling the heater temperature to remain below certain thresholds, the controller can assure that the heating elements 108 never rise above a temperature at which a dry fire could start. Thus, improved safety in operation is achieved by this design using the printed heating elements 108 with the directly mounted temperature sensors 110.

As also shown in FIGS. 7 and 9, the printed heating elements 108 define an internal resistor circuit trace 114 that is used to produce the heat energy for the cooking medium in the cooking vat 100. The resistor circuit trace 114 within the printed heating elements 108 is terminated in this design at a series of threaded studs 116 which are connected by wires 118 (partially shown) to a power source. The control of the heating elements 108 through the threaded studs 116 allows the design to remain low profile, limiting the space required for mounting the heating elements 108 to the cooking vat 100. As noted above, the printed heating elements 108 may be directly coupled to the bottom wall 102 of the cooking vat 100 using adherence, welding, clamp connections, or the like, and the heating elements 108 contain layers or internal features that guide heat energy from the heating elements 108 into the cooking vat 100 and the cooking medium flowing therein. Thus, this embodiment of the cooking vat 100 is both space-efficient and energy-efficient because losses of thermal energy are minimized by the arrangement of elements and their internal designs. As set forth above, the external mounting of the heating elements 108 avoids the need to place these elements inside the cooking vat 100, which therefore reduces the overall cooking medium volume that must be used in this automatic cooking system. Oil life may also be improved when placing the heating elements 108 out of direct contact with the cooking medium, in some implementations.

Figure 10:
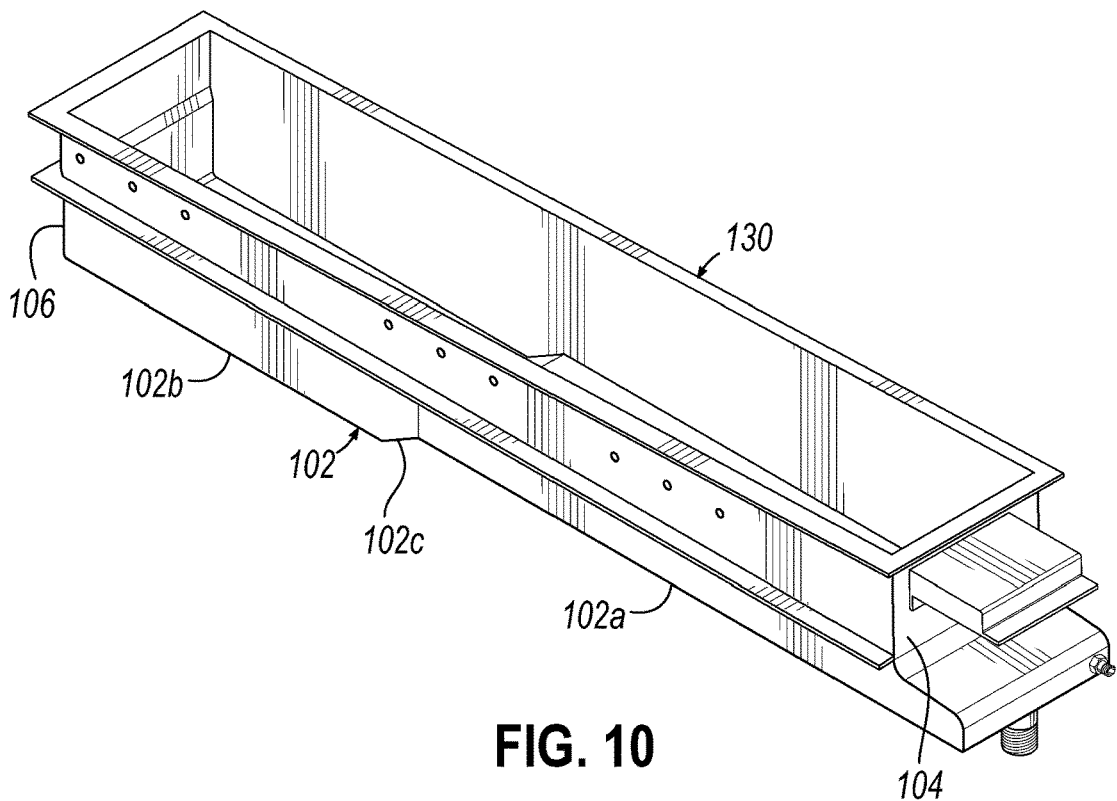
FIG. 10 is a top perspective view of a cooking vat of an automatic cooking system in accordance with another embodiment of the invention, the cooking vat being similar in configuration and shape as the one shown in FIGS. 7 through 9 and including printed heaters along an external surface thereof.
Figure 11:
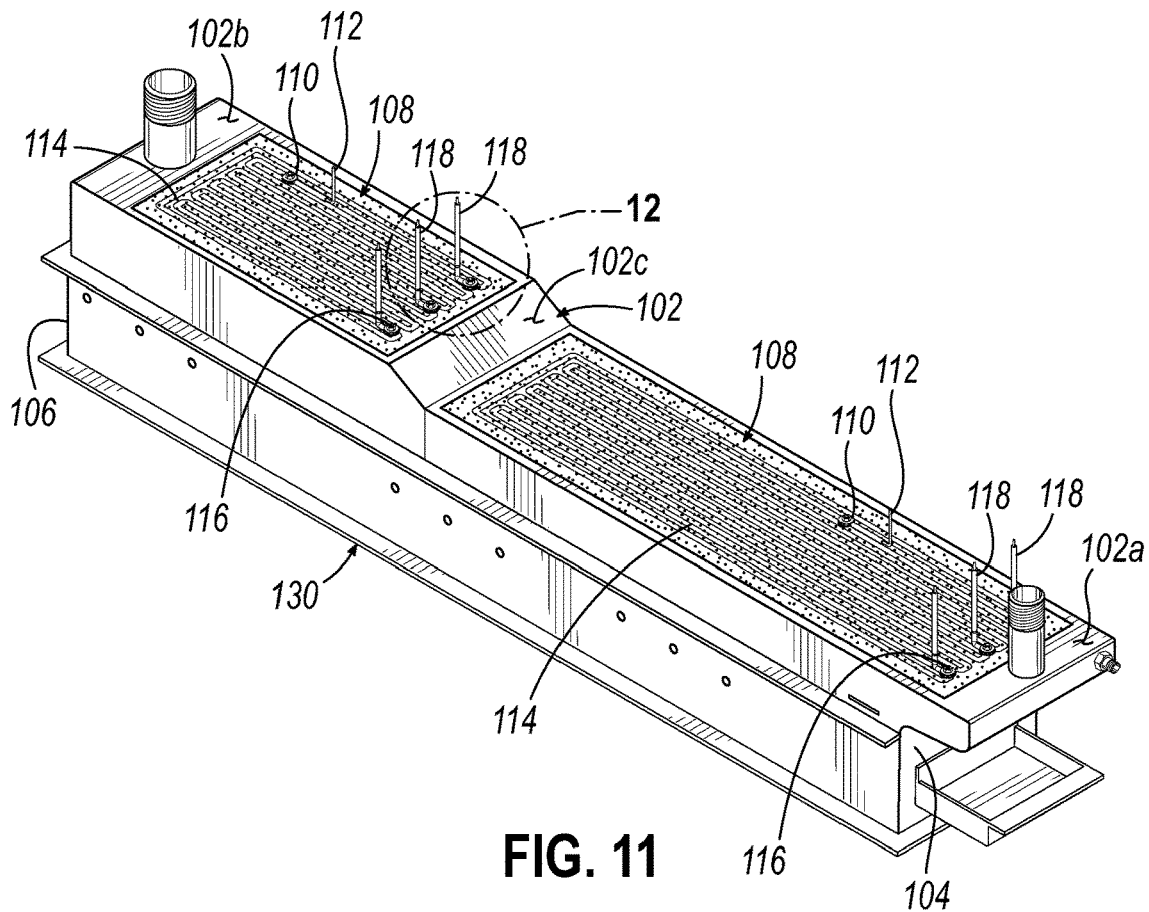
FIG. 11 is a bottom perspective view of the cooking vat and the printed heaters of FIG. 10.
Figure 12:
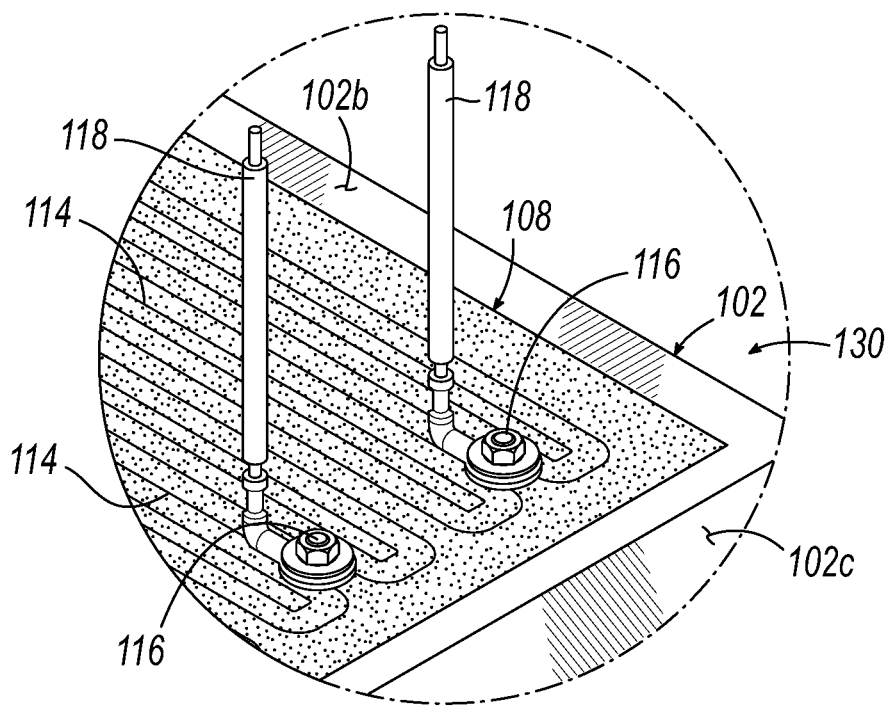
FIG. 12 is a detailed perspective view of one portion of the cooking vat and printed heaters of FIG. 11.

With reference to FIGS. 10 through 12, another cooking vat 130 in accordance with another embodiment of an automatic cooking system of this invention is shown in detail. This embodiment of the cooking vat 130 includes a shape and profile largely similar to the cooking vat 100 of the previous embodiment, and as such, similar reference numbers are used on elements that are essentially unchanged from the previous embodiment. These elements include the bottom wall 102 (with first portion 102a, second portion 102b, and transition portion 102c), the inlet end 104, the outlet end 106, the printed heating elements 108, the temperature sensors 110, and the resistor circuit traces 114, among other elements. The cooking vat 130 does not include angled sidewall portions or chamfered corners along the second portion 102b of the bottom wall 102, and as such, the total planar surface area defined by the first and second portions 102a, 102b of the bottom wall 102 are slightly larger in size than in the previous embodiment in FIGS. 7 through 9. The printed heating elements 108 are modified only in this embodiment to be larger in size, thereby being engaged with and covering a larger overall surface area of the first and second portions 102a, 102b of bottom wall 102. This design allows for more heat energy to be delivered efficiently into the cooking vat 130 and the cooking medium and food product flowing therein, e.g., providing uniform heating. Regardless, the same benefits of a low profile and reduced oil volume use are achieved by this alternative embodiment.

In FIG. 12, the termination of the resistor circuit traces 114 of the heating elements 108 at threaded studs 116 is shown in greater detail. The wires 118 delivering electrical energy to cause the resistor circuit traces 114 to produce heat energy are shown connected in position by the threaded studs 116. In this regard, a controller or power source of the automatic cooking system controls the amount of heat energy being produced via the energy provided by the wires 118, and such control may be based on temperature sensor readings from within the cooking vat 130 as well as based on signals from the temperature sensors 110 mounted directly on the heating elements 108, thereby enabling the controller to avoid heating the heating elements 108 to a temperature that would risk a dry fire condition. Consequently, this embodiment of the cooking vat 130 provides many of the same technical advantages as described in association with other embodiments. It will be understood that the particular size and shape of the cooking vat 130 and the heating elements 108 may be modified in other embodiments, including, for example, having multiple lanes in adjacent relation for the automatic cooking system, and mounting the heating elements 108 to additional/alternative surfaces like the sidewalls.

Figure 13:
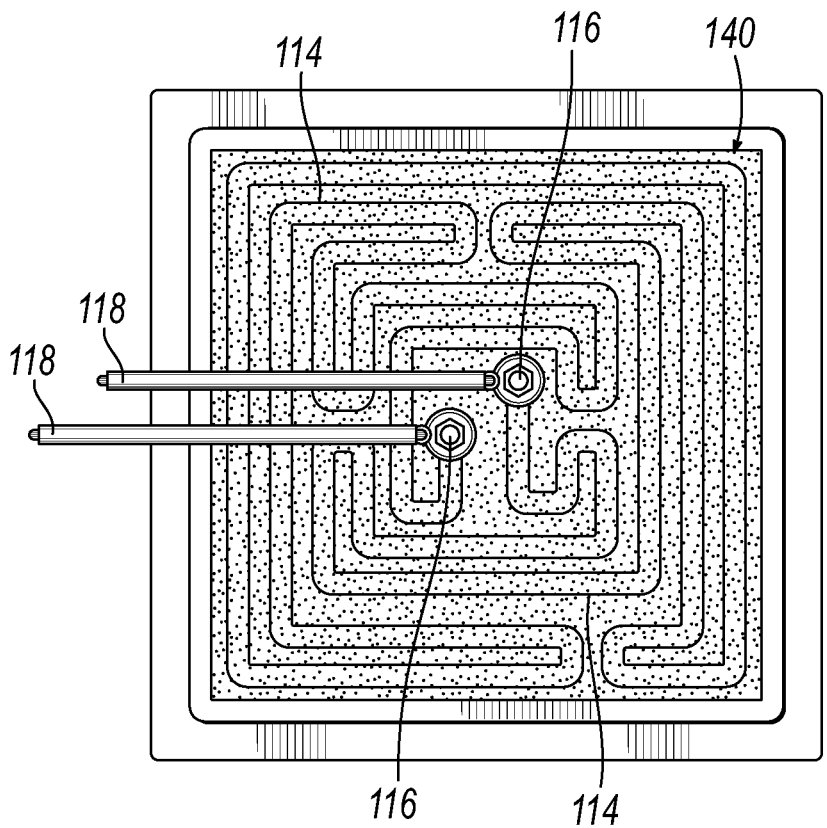
FIG. 13 is a bottom plan view of a printed heater that may be used with various cooking vat designs in accordance with further embodiments of the invention.

FIG. 13 illustrates an alternative embodiment of a printed heating element 140 that may be used with any of the embodiments of the automatic cooking systems described herein. As shown in FIG. 13, the printed heating element 140 is square in shape and is configured to cover a substantial portion of a bottom surface of a cooking vat or portion thereof, so as to thereby provide generally uniform heating of the cooking vat and the cooking medium therein. The printed heating element 140 again includes a resistor circuit trace 114 terminated at threaded studs 116 connected to power supply wires 118. One or more of these printed heating elements 140 may be combined to cover the external surfaces of the cooking vat of the automatic cooking systems of this invention.

It will be appreciated that the heating elements may be repositioned or reconfigured in other embodiments of the invention depending on the needs and desires of the end user. In one example, the printed heating elements may be coupled to side surfaces of a cooking vat as well as the bottom surface, as was alluded to above in the example with clamped plate heaters. The external mounting of the heaters is configured to provide uniform heating while allowing for reduced oil volume use when operating automatic cooking devices using elongated lanes defined by the cooking vats and cooking medium and food product flow during the cooking process.

In still further alternative embodiments using the low profile printed heating elements, the printed heating elements may also be located inside the cooking vat, but the low profile and small thickness of these heating elements continues to allow for minimized oil volume use even when placed within the cooking vat (e.g., the low profile provides minimal disruption to cooking medium flow and thus produces less turbulence that can also reduce oil lifespan). Additional modifications to the embodiments shown and described herein with the external mounted heating elements will be understood by those skilled in the art when using these heaters internally, such as connecting the temperature sensor and control wires to the heater when submersed within a cooking medium. The various designs of the automated cooking system and other fryers using printed heating elements achieve advantages and additional functionalities (such as increased safety and reduced risk of dry fires) over the known fryer designs.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. An automatic cooking system for frying food products, comprising:
    a cooking vat configured to hold a cooking medium and to receive food product, the cooking vat defining at least one elongated lane extending between an inlet end where the food product is inserted into the cooking vat and an outlet end where the food product is removed from the cooking vat, wherein each lane of the cooking vat includes a bottom wall and sidewalls extending along the lane;
    an oil recirculation and filtration system in communication with the inlet end and the outlet end of the cooking vat, the oil recirculation and filtration system configured to generate a continuous flow of the cooking medium from the inlet end to the outlet end, the continuous flow of the cooking medium being configured to move the food product between the inlet end and the outlet end during a cooking process at the cooking vat;
    a heating element coupled to at least one of the bottom wall and the sidewalls of the cooking vat, the heating element comprising at least one printed heating element directly coupled to the cooking vat so as to transfer heat by conduction to heat the cooking medium;
    a controller operatively coupled to the oil recirculation and filtration system and to the heating element; and
    a temperature sensor coupled directly to the heating element and configured to measure a heater temperature of the heating element and communicate the heater temperature to the controller, and another temperature sensor located within the cooking vat and sensing temperature of the cooking medium within the cooking vat, wherein the controller controls the heating element based on both (i) temperature sensor readings taken of the cooking medium from the temperature sensor located within the cooking vat and (ii) heater temperature readings of the temperature sensor coupled directly to the heating element, to prevent the heater temperature exceeding a temperature that causes a dry fire condition,
    wherein the printed heating element defines a low profile that does not impede the continuous flow of the cooking medium,
    wherein the printed heating element is coupled to the cooking vat by being printed on at least one of the bottom wall and the sidewalls of the cooking vat, thereby making the printed heating element and the cooking vat define a unitary, one-piece construction, and
    wherein in use, food products placed into the inlet end of the cooking vat are moved along the at least one elongated lane because of the continuous flow of the cooking medium, and wherein food product movement is mechanically controlled only by gates located along a length of the at least one elongated lane, with the gates configured to open and close to selectively allow further cooking medium-driven food product flow but the gates not being configured to physically convey any food products along the at least one elongated lane.

2. The automatic cooking system of claim 1, wherein the at least one printed heating element further comprises a resistor circuit trace that is spread over a surface area of the cooking vat to provide heat energy into the cooking vat.

3. The automatic cooking system of claim 1, wherein the heating element includes a plurality of heating elements connected to the exterior of the cooking vat, and each heating element has a temperature sensor coupled directly to the heating element.

4. The automatic cooking system of claim 1, wherein the heating element is connected to the bottom wall of the cooking vat.

5. The automatic cooking system of claim 4, wherein the heating element is sized to engage more than 50% of a surface area defined along the bottom wall of the cooking vat.

6. The automatic cooking system of claim 4, wherein the heating element is also connected to the sidewalls of the cooking vat.

7. The automatic cooking system of claim 1, wherein the bottom wall of each lane in the cooking vat is angled upwardly along at least a portion of a length from the inlet end to the outlet end.

8. The automatic cooking system of claim 4, wherein the heating element is directly coupled to only the bottom wall of the cooking vat.

9. The automatic cooking system of claim 1, wherein the cooking vat includes a plurality of elongated lanes running parallel to one another between the inlet end and the outlet end, with the continuous flow of the cooking medium configured to drive food product movement along each of the plurality of elongated lanes.

* * * * *